July 4, 1972 J. ROOS 3,674,629
THIN TAPE OR FOIL MADE OF AN ELECTRICALLY
INSULATING SYNTHETIC MATERIAL
Filed Jan. 7, 1969

INVENTOR.
JAN ROOS
BY
Agent

United States Patent Office 3,674,629

Patented July 4, 1972

3,674,629
THIN TAPE OR FOIL MADE OF AN ELECTRICALLY INSULATING SYNTHETIC MATERIAL

Jan Roos, Emmasingel, Eindhoven, Netherlands, assignor to U.S. Philips Corporation, New York, N.Y.

Filed Jan. 7, 1969, Ser. No. 789,512
Claims priority, application Netherlands, Jan. 17, 1968, 6800694
Int. Cl. B32b *15/08;* H01b *13/00;* H01g *1/00*
U.S. Cl. 161—214 7 Claims

ABSTRACT OF THE DISCLOSURE

A thin tape of foil of an insulating material for wound capacitors having on one side a layer of metal and on the other side an insulating oxide of the metal.

Figure 1:
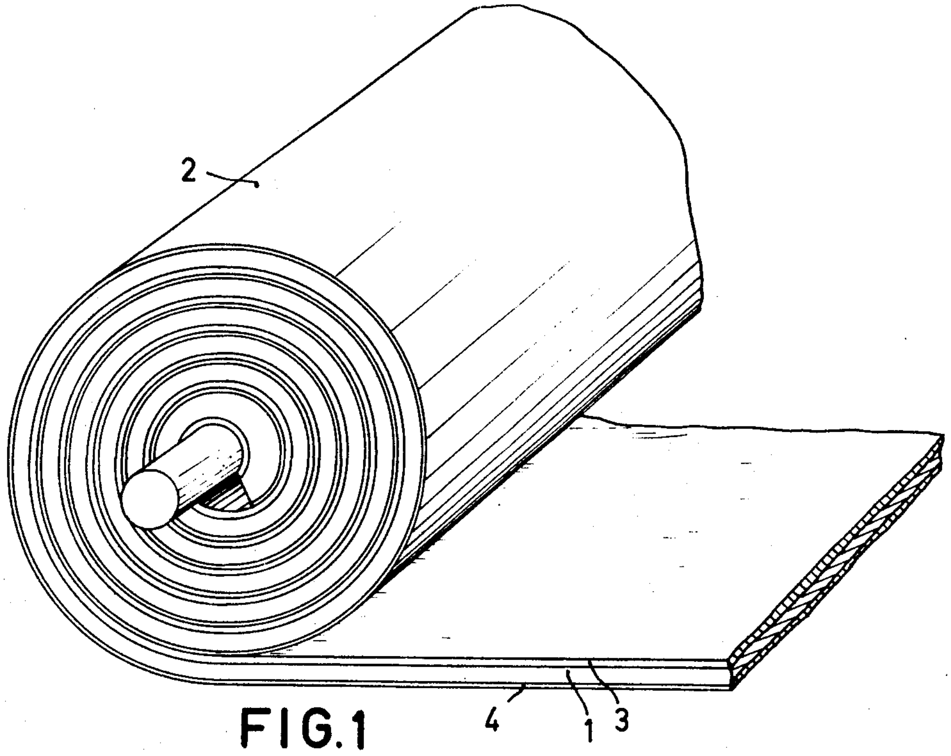

The invention relates to a thin tape of foil made of an electrically insulating synthetic material, more particularly for manufacturing electrical wound capacitors, which tape or foil is coated on one side with an electrically conducting metal layer. Such a tape or foil is known but has the disadvantage that, when it is rolled up or stacked, there is a contact potential difference between the tape and the layer so that the unwinding operation involves the risk of spark formation and in general difficulties are involved in unwinding the rolled-up tape or foil. The invention has for an object to avoid these disadvantages of the known construction.

According to the invention, the other side of the tape or foil is provided with a layer of a material which is electrically insulating, whilst the contact potential difference between this layer and the metal layer on the other side when these contact one another is substantially equal to zero. Thus, the rolled-up parts are prevented from spontaneously sticking together and the risk of spark formation is avoided.

If one side of the tape or foil is provided in the usual manner with a layer of aluminum applied in a vacuum by vapour deposition, it is advantageous and moreover simple from a manufacturing point of view to coat the other side of the tape or foil with an extremely thin layer of alumina. According to a further feature of the invention, this layer preferably has a thickness of 10 to 100 A.; thus, it is ensured that the layer applied is homogeneous and indeed consists solely of alumina.

The invention further relates to a method of manufacturing a thin tape or foil of the kind set forth; this method, in which a tape or foil to be metallised and made of an electrically insulating synthetic material is unwound from a roll and is coated with an electrically conducting layer by vapour deposition and is then rewound, is characterized in that before the winding operation the other side is coated also by vapour deposition with a layer of a material which is converted, as the case may be after its application and before the winding operation, into an electrically insulating material.

In a simple embodiment of the method according to the invention, in which both layers consist of aluminum, the extremely thin second aluminum layer is entirely converted into oxidized aluminum by exposure to an oxygen-containing gas, preferably the ambient atmosphere.

The invention also relates to a wound capacitor comprising a tape or foil manufactured by one or more of the methods described above.

Figure 2:
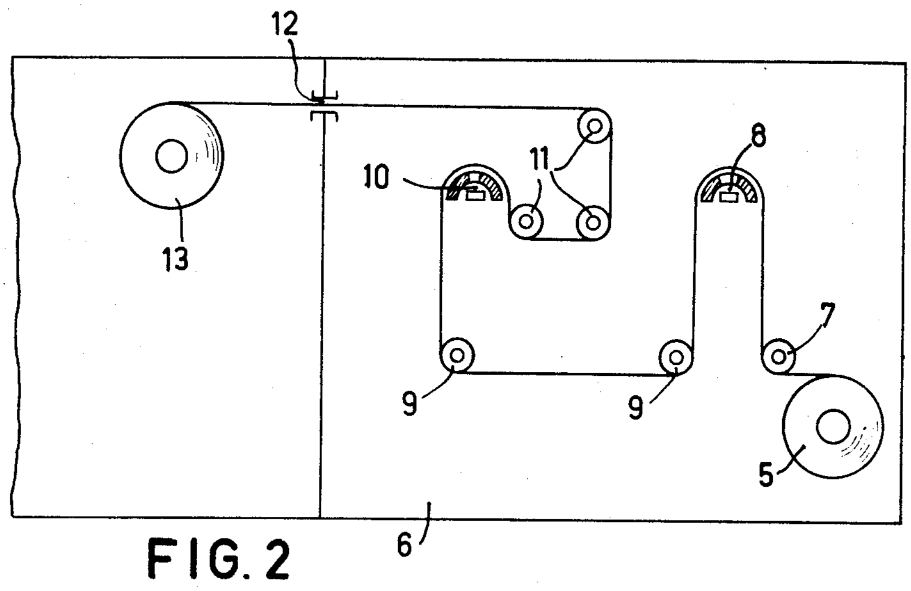

The invention will be described more fully with reference to the drawing, which shows an embodiment of the invention and in which:

FIG. 1 is an isometric elevation of a partly wound tape of synthetic material, which is coated on both sides with a layer of material, and FIG. 2 shows a device for manufacturing the tape of FIG. 1.

Referring now to FIG. 1, reference numeral 1 denotes a tape which is made of a synthetic material and is coated on one side, for example, by vapour deposition in a vacuum, with a layer 3 of metal, preferably aluminum. This tape is preferably made of a synthetic material referred to as polyethylene terephthalate. This tape is rolled up so as to form a roll 2. If the tape should be coated only with the layer 3, the difference in contact potential between the aluminum and the uncoated side of the tape would result in a static charge of the tape. This gives rise to difficulties when the tape is unwound; the aluminum layer 3 may stick to the uncoated side and there is a risk of spark formation which may cause the aluminum of the layer 3 to locally evaporate, whilst electric breakdown of the tape may also occur. The unwound tape has a static charge which is disturbing in further processing the tape. In order to avoid these disadvantages, the other side of the tape is coated with a very thin layer of aluminum-oxide 4 which has a thickness of the order of 10 to 100 A. This thickness is so small that, if the layer 4 should originally consist of aluminum, it would be converted when being unwound and exposure to the ambient atmosphere, would convert this layer substantially immediately into oxidized aluminum, which is electrically insulating and has no contact potential difference with respect to the similarly oxidized surface of the thick aluminum layer so that no difficulties are involved in processing of the tape.

A device for manufacturing the tape or foil is shown diagrammatically in FIG. 2. A roll 5 of tape of a synthetic material, preferably again polyethylene terephthalate, is placed in a vacuum vessel 6. The tape 5 is guided over a roller 7 and then passes a vapour-deposition device 8, the tape being coated on one side with a comparatively thin aluminum layer of, for example, 0.1 to 0.5$\mu$ (FIG. 1). The tape is then guided over rollers 9 past a second vapour-deposition device 10 and the other side of the tape is coated with a layer 4 which is extremely thin when compared with the layer 3 and has a thickness of, for example, 10 to 100 A. (FIG. 1). After having passed further guiding rollers 11, the tape is guided through a sluice 12 outside the vacuum vessel 6 and due to exposure to the oxygen in the ambient atmosphere the latter layer is substantially immediately converted completely into oxidized aluminum, which is electrically insulating. The surface of the thick layer is likewise converted into a thin oxide film. Subsequently, the tape or foil thus treated is rewound to from a roll 13 which can be readily unwound and further processed.

It is not necessary for the tape or foil 1 to be made of polyethylene terephthalate; other synthetic materials easily acquiring electrostatic charges such as polycarbonates, may also be used.

The vapour-deposition process is not essential to the invention either; the tape or foil may be coated on either side with a thick and a thin layer, respectively, for example, by pressing at an elevated temperature.

It is also possible to replace aluminum by other metals; for example, a very thin layer of chromium may also be readily converted into chromium oxide; this oxide layer is electrically insulating and does not exhibit a contact potential difference with respect to the chromium oxide film on the thick layer.

It is not required for the extremely thin layer to be converted to an oxide layer immediately after application; this oxidation may also be carried out during the further processing of the roll in manufacturing the capacitors. It is only required that the conversion into an oxide layer should be complete so that the occurrence of a contact potential difference is avoided.

An advantage of tapes or foils according to the invention is inter alia that wound capacitors can be obtained the subsequent turns of which are located close to each other due to the absence of electrostatic charges on the metallised tapes or foils which are each unwound from a roll and are then wound simultaneously for the formation of the capacitor body, so that air occlusions are substantially completely avoided.

What is claimed is:

1. A thin tape comprising an niner layer consisting of a self-supporting plastic foil of an electrically insulating synthetic material, a first outer layer, consisting of a metal, in contact with one surface of said inner layer, and a second outer layer, consisting of an electrically insulating oxide of the same metal as in the first layer in contact with the opposing surface of said inner layer.

2. The tape of claim 1 wherein the first outer layer is aluminum and the second metal layer is aluminum oxide.

3. The tape of claim 2 wherein the layer of aluminum oxide has a thickness of 10 to 100 A.

4. A method of manufacturing the tape of claim 1 comprising the steps, unwinding a tape consisting of an electrically insulating synthetic material from a roll, depositing, by vapor deposition, a thin layer of an oxidizable metal on both surfaces of said electrically insulating material and subjecting one of said thus applied metal layers to the action of an oxidizing gas for a time sufficient to completely oxidize said metal layer.

5. The method of claim 4 wherein the vapor deposition is carried out in a vacuum.

6. The method of claim 5 wherein aluminum is first deposited on both surfaces of the electrically insulating synthetic material and one of the thus deposited layers of aluminum is converted by exposure to air to aluminum oxide.

7. A method of producing a wound capacitor comprising simultaneously winding at least two tapes of claim 1.

References Cited

UNITED STATES PATENTS

| | | | |
|---|---|---|---|
| 2,456,381 | 12/1948 | Clark | 161—214 X |
| 2,593,829 | 4/1952 | Arledter | 161—214 X |
| 2,735,970 | 2/1956 | Peck et al. | 161—214 X |
| 3,431,135 | 3/1969 | Keane et al. | 161—214 X |

JOHN T. GOOLKASIAN, Primary Examiner

C. B. COSBY, Assistant Examiner

U.S. Cl. X.R.

148—174; 156—47, 150; 161—225; 317—260

PO-1050
(5/69)

UNITED STATES PATENT OFFICE
CERTIFICATE OF CORRECTION

Patent No. 3,674,629 (PHN 2928) Dated July 4, 1972

Inventor(s) JAN ROOS

It is certified that error appears in the above-identified patent and that said Letters Patent are hereby corrected as shown below:

Column 3, line 13, "niner" should read -- inner --.

Signed and sealed this 29th day of May 1973.

(SEAL)
Attest:

EDWARD M.FLETCHER,JR.
Attesting Officer

ROBERT GOTTSCHALK
Commissioner of Patents